No. 781,706. PATENTED FEB. 7, 1905.
E. ZIEHL.
ALTERNATING CURRENT GENERATOR.
APPLICATION FILED SEPT. 30, 1904.
2 SHEETS—SHEET 1.
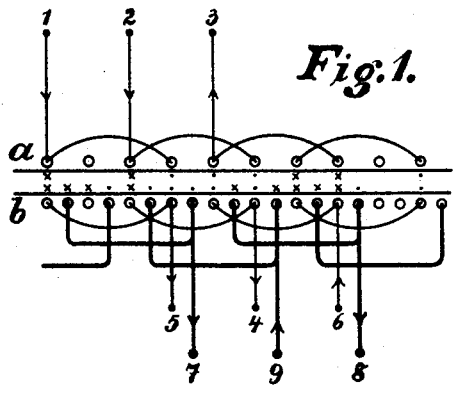
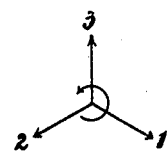
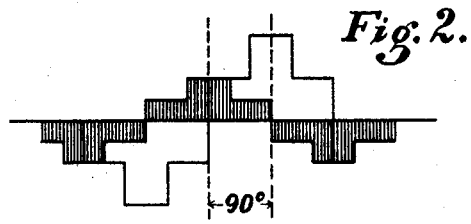
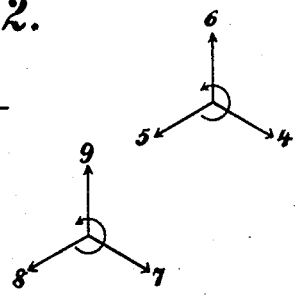
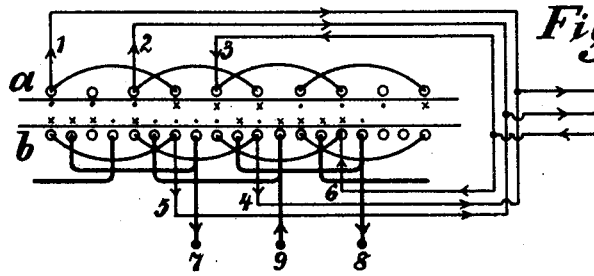
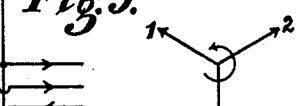
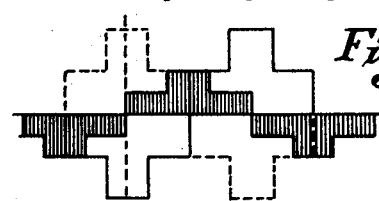
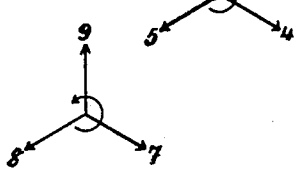
Witnesses
H. M. Kuehne
John A. Percival
Inventor
Emil Ziehl
By Richardson
Attorneys

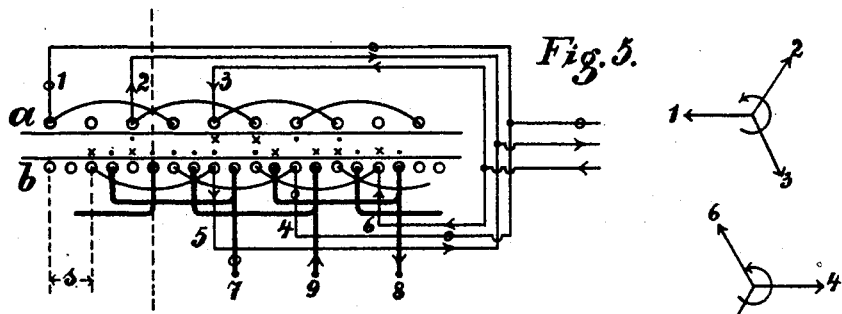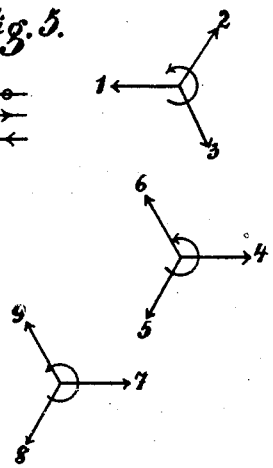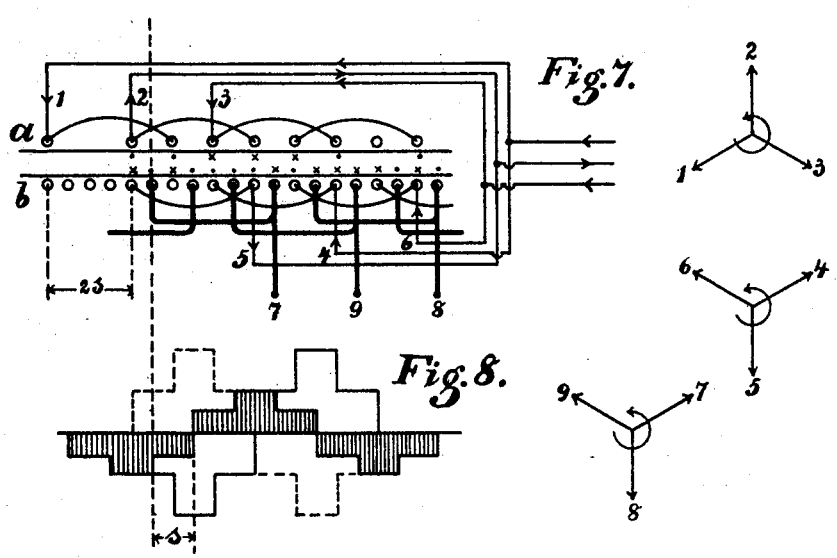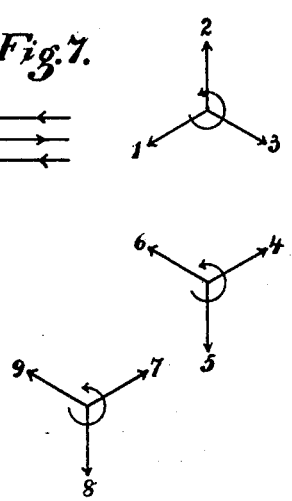

No. 781,706.                                              Patented February 7, 1905.

UNITED STATES PATENT OFFICE.

EMIL ZIEHL, OF BERLIN, GERMANY.

ALTERNATING-CURRENT GENERATOR.

SPECIFICATION forming part of Letters Patent No. 781,706, dated February 7, 1905.

Application filed September 30, 1904. Serial No. 226,711.

*To all whom it may concern:*

Be it known that I, EMIL ZIEHL, engineer, a subject of the German Emperor, residing at Berlin, Germany, have invented new and useful Improvements in Alternating-Current Generators, of which the following is a specification.

The present invention relates to a monophase or polyphase electrical machine with a revolving excitation-field energized by alternating current, in which machine there is an energy-giving winding on the stationary as well as on the revolving part. In such a machine the excitation-winding on one of the two electromagnet-bodies can be so arranged that the fields of the two windings on the same magnet-body are displaced by a half-pole distance the one against the other.

The invention is applicable to generating-machines as well as to motors and to transformers of current strength, potential, and periodicity.

In the accompanying drawings the construction of a triphase-current generator is shown diagrammatically, as an example, in accordance with the invention, together with diagrams showing the magnetization and phases.

Figure 1 shows a three-phase winding on the one and two three-phase windings on the other electromagnet-body. Fig. 2 is the diagram to Fig. 1. Fig. 3 shows a modification in which the winding on the one electromagnet-body is parallel to the one winding on the other electromagnet-body. Fig. 4 is the diagram to Fig. 3. Figs. 5 and 6 show this modification after the electromagnet-body with the two windings has advanced through one-third of a pole distance. Figs. 7 and 8 show the modification of Fig. 3. The electromagnetic body with the two windings has advanced through two-thirds of a pole distance.

The electromagnet-body $a$, Fig. 1, has a three-phase winding with the phases 1 2 3, while the electromagnet-body $b$ has two three-phase windings 4 5 6 and 7 8 9, which are displaced by a half-pole distance the one against the other. If the two magnet-bodies $a$ and $b$ remain stationary and a three-phase current is sent through the windings 7 8 9, a revolving field is produced which, as is known, travels round to the right or left, according to the relation of the phases, at a rate of revolution equal to the frequency of alternation divided by the number of poles. There are consequently induced in the opposite windings 1 2 3 alternating potentials of the same frequency, and corresponding alternating potentials are produced also in the three-phase winding 4 5 6. If the two windings 1 2 3 and 4 5 6 were closed, their fields would be in the same position and direction and would be added together, Fig. 2. If now the electromagnet-body $b$ is made to rotate, alternating potentials will be induced in the three-phase windings 1 2 3 of a frequency of alternation equal to the sum or difference of the frequency of alternation of the field of the three-phase winding 7 8 9 and the speed of rotation multiplied by the number of poles of the magnet-body $b$. Thus, for example, if $z'$ is the frequency of alternation in the three-phase winding 1 2 3 $z^2$ is the frequency of alternation in the three-phase winding 7 8 9, $p$ the number of poles of the magnet-body $a$, (and of $b$ also,) $n$ the relative speed of rotation between the two magnet-bodies $a$ and $b$. There is (1) $z' = z^2 + p\,n$ if the direction of rotation is such as to augment the speed of the field, or (2) $z' = z^2 - p\,n$ if the direction of rotation is contrary to the direction of rotation of the field. The frequency of alternation in the three-phase winding 1 2 3 will therefore be *nil* if the speed of revolution of the field of the winding 7 8 9 is just as great as the speed of revolution of the magnet-body $b$, but in the contrary direction. The frequency of alternation in the three-phase winding 1 2 3 will be double as great as that in the three-phase winding 7 8 9 if the rotations of the field and of the magnet-body are in the same direction. The frequency of alternation of the three-phase winding 1 2 3 will also be equal to the frequency of alternation of the three-phase winding 7 8 9 when the mechanical speed of rotation is double the field speed, but in the opposite direction. In the latter case the potentials in the three-phase winding 1 2 3 are naturally reversed. If the respective circuits are closed, the fields of the phases 1 2 3 and 4 5 6 will also rotate in opposite directions. Thus if mechanical energy is imparted to the system above described in the form of the rotation of the magnet-body $b$ the windings 1 2 3 and 4 5 6 both give out electric energy, while at the same time the fields of the said windings destroy each other.

The currents of the windings 1 2 3 and 4 5 6 can be separately utilized. If they are of equal potential, the windings can be joined in parallel, and if of equal strength of phase-current they can be joined in series.

Fig. 3 illustrates a machine in which the three-phase windings 1 2 3 and 4 5 6 are connected in parallel in order to work jointly in a three-wire circuit. The phases 7 8 9 of the actual excitation-winding can be supplied from an alternating or revolving current excitation-machine directly coupled with the generator from a synchronously-running machine, from a transformer, or from the three-wire network of the machine itself either with or without a potential or current transformer. As in this latter case the feeding-current for the winding 7 8 9 is derived from the machine itself, the latter becomes a self-exciting machine. In Fig. 4, again, the resulting ampere-windings, or rather magnetic fields, are shown for the moment, in which the revolving-current systems have evidently the phases of the adjacent current-diagram. The excitation-field originating from the phases 7 8 9 is shown by cross-hatching. Figs. 5 and 6 show the direction of the current and magnetic fields when the current phases have all moved through thirty degrees and the magnet-body $b$ has advanced through one-third of a pole-space. Figs. 7 and 8 show the direction of current when each current phase has turned through a further thirty degrees—*i.e.*, through sixty degrees from the position of Figs. 3 and 4—while the magnet-body has also advanced through a further one-third pole-space. It is thus seen that the fields of the phases 1 2 3 and 4 5 6 at all times entirely annul one another when the speed of mechanical rotation is double as great as that of the revolving current, but in opposite direction to the latter.

As the two current systems 1 2 3 and 4 5 6 have the same functions, the magnet-bodies $a$ and $b$ can be interchanged—that is to say, the magnet-body $a$ may rotate while $b$ is stationary. Further, as all three windings have an equal number of poles the excitation-winding 7 8 9 can be split into two parts, of which the one is wound on the magnet-body $a$ and the other symmetrically on the magnet-body $b$, both having the same phases.

For this invention it is a matter of indifference what is the number of phases of the current giving the primary revolving field and what is the number of phases taken in the generated current. It is possible, for example, to excite the primary revolving field by a three-phase-current winding and to take from the machine monophase, diphase, triphase, or polyphase currents. It is also possible to excite the primary revolving field by monophase current if one of the two fields rotating in opposite directions is utilized into which the field of a monophase current may be imagined to be split up. The corresponding windings must of course be arranged accordingly.

The equations (1) and (2) show that by the use of a revolving excitation-field of any desired alternation frequency or number of phases alternating currents of any desired number of phases and with an alternation frequency of any number from naught upward can be obtained. Instead of obtaining the excitation from a third, or rather at the same time from a fourth, monophase or polyphase winding the excitation can be effected from the circuit-conductors of the machine itself. The excitation-currents then undergo a phase displacement of ninety degrees against the terminal potential moving them and are therefore wattless currents.

If the two energy-giving windings work with equal periodic frequency in a circuit-network, with constant terminal potential furnishing a current, these current-giving windings may receive from their own circuit-network at the given terminal potential so-called "wattless" currents in order to produce excitation-fields which are displaced ninety degrees against those of the watt-currents. In this manner, then, the separate excitation-winding is rendered superfluous, and the two energy-giving windings in the generator serve both for giving out energy and for receiving the excitation in the form of a current with phase displaced, which current is made up from the wattless excitation-current and the watt-giving current.

Having now described my invention and in what manner the same is to be performed, what I claim, and desire to secure by Letters Patent, is—

1. In electrical machines with monophase or polyphase current excitation and giving monophase or polyphase currents the combination of an energy-giving winding on the stationary part with an energy-giving winding on the revolving part, substantially as described and for the purpose set forth.

2. In electrical machines with monophase or polyphase current excitation and giving monophase or polyphase currents the combination of an energy-giving winding on the stationary part with an energy-giving winding on the revolving part, and a further separate monophase or polyphase winding, which is arranged in such a manner, that the fields of the two windings on the same electromagnet-body are displaced through a half-pole distance, the one against the other, substantially as described and for the purpose set forth.

3. In electrical machines with monophase or polyphase current excitation and giving monophase or polyphase currents the combination of an energy-giving winding on the stationary part with an energy-giving winding on the revolving part, and a further separate monophase or polyphase winding on each electromagnet-body, which are arranged in such a manner, that the fields of the two windings on each electromagnet are displaced through a half-pole distance, the one against the other, substantially as described and for the purpose set forth.

In testimony whereof I have signed my name to this specification in the presence of two subscribing witnesses.

EMIL ZIEHL.

Witnesses:
OTTO MUNK,
H. M. KUEHNE.